April 15, 1969     A. R. BRAULT     3,438,133

LAYOUT MACHINE WITH ENCODER MEANS

Filed June 15, 1966

*INVENTOR.*
ANDRE R. BRAULT

United States Patent Office 3,438,133
Patented Apr. 15, 1969

3,438,133
LAYOUT MACHINE WITH ENCODER MEANS
Andre R. Brault, North Merrick, N.Y., assignor to OPTOmechanisms, Inc., Plainview, N.Y.
Filed June 15, 1966, Ser. No. 557,706
Int. Cl. G01d 21/00
U.S. Cl. 33—1                                    1 Claim

ABSTRACT OF THE DISCLOSURE

The invention comprises a work layout machine having a pair of carriages adapted to move a work means accurately with respect to coordinate axes, and means on each carriage for encoding and transmitting X and Y coordinate information to visual display counters or other utility apparatus.

---

This invention relates to work layout machines of the type having a pair of carriages adapted to move a work means accurately with respect to coordinate axes and more particularly to such layout means having means for encoding and transmitting coordinate information to a visual counter or other utility apparatus.

This application is an improvement of Patent No. 2,995,826, granted Aug. 15, 1961 entitled: Layout Machine, and Patent No. 3,212,194, granted Oct. 19, 1965, entitled: Automatic Work Layout Means.

Work layout machines of the prior art do not have encoder-transmitter means to transmit coordinate information to visual counters or other utilization apparatus, such as a computer or programming means.

The present invention provides means to solve this problem including encoder means mounted on each carriage. The encoder-transmitting means have a friction wheel which is adapted to roll along the guide rails of the layout machine. The friction wheels are mounted to drive a rotary type transmitter which is of the type generating pulses proportionally to input shaft rotations.

Accordingly, a principal object of the invention is to provide new and improved work layout means with an encoder-transmitter means.

Another object of the invention is to provide new and improved encoder-transmitter means for a work layout machine.

Another object of the invention is to provide new and improved encoder-transmitter means having a work layout machine and having easy to read visual counter means.

Another object of the invention is to provide new and improved encoder-tarnsmitter means for a work layout machine to provide automatic readout means which are adapted to be connected to utilization apparatus such as visual counters, computers or programmers.

These and other objects of the invention will be apparent from the following specification and drawings of which:

Figure 1:
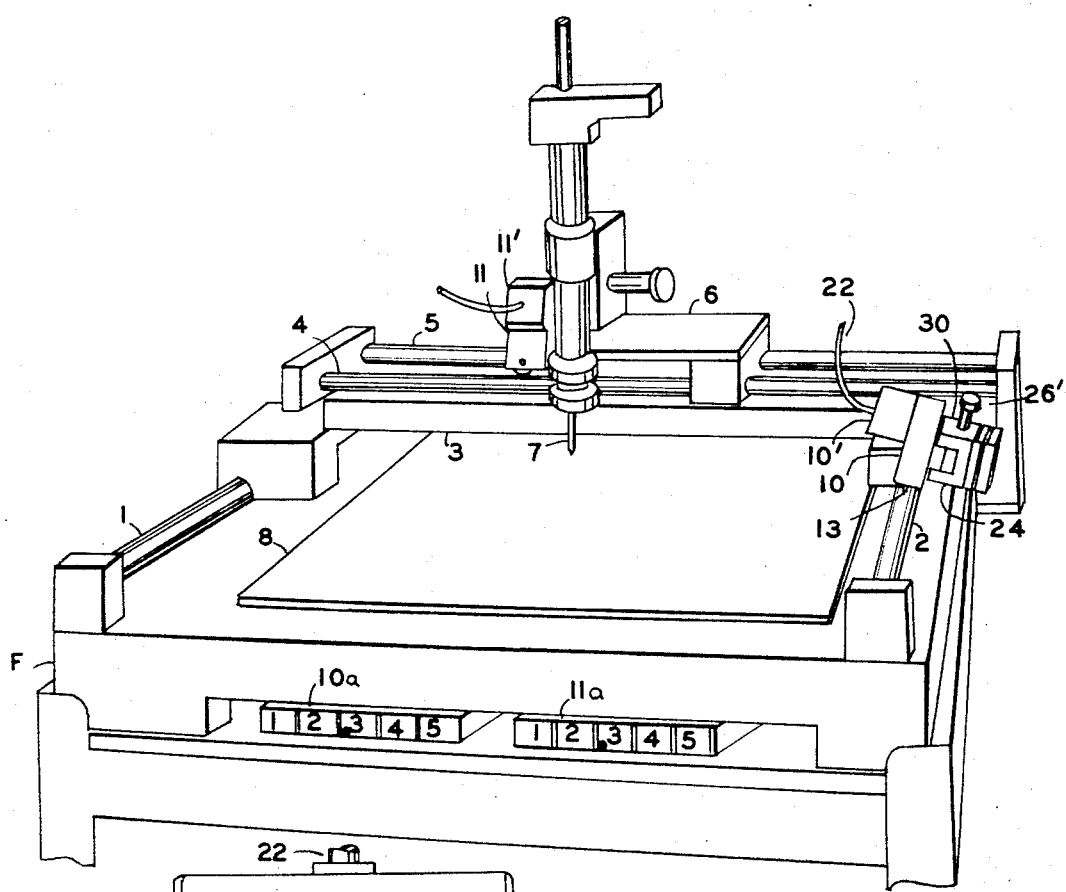
FIGURE 1 is a perspective view of the embodiment of the invention.

Referring to the figures, FIGURE 1 shows a typical work layout machine having a frame F which mounts two parallel rails 1 and 2. A first carriage 3 is adapted to ride on the rails 1 and 2 parallel one axis of the machine which may be called the Y axis. Mounted on the first carriage 3 are a pair of parallel rails 4 and 5. Their axes are perpendicular to the axes 1 and 2. A second carriage 6 is adapted to ride on the rails 4 and 5, along the X axis. The second carriage is adapted to mount a work apparatus such as a drill press or stylus 7 or other marking or locating means which are adapted to locate points or drill holes in the work piece 8, which is mounted on the center table of the frame F.

The carriages are mounted on the rails with precision bearings as described in the above mentioned patent applications. The carriages may be positioned by hand or if they are large and heavy they may be driven by a motorized screw arrangement.

In order to transmit the coordinate information to utilization apparatus, a first encoder transmitter 10 is mounted on the first carriage 3 and a second encoder 11 is mounted on the second carriage as will be explained in more detail.

Each encoder-transmitter has a friction wheel which is adapted to ride on a rail. The friction wheels are geared to a pulse transmitter of the type having a rotary shaft input. Therefore, the encoder-transmitter 10 will transmit the Y coordinate information and the transmitter 11 will transmit the X coordinate information. The transmitters are connected to visual indicators 10a and 11a or if desired they may be connected to computers, tape recording means, comparison checking means, programming means or other utilization devices.

The counters may be of the type having a plurality of conventional "nixie" tube which display the coordinate information. Automatic reset buttons are preferably provided in the indicators. Other type indicators may be used. The indicator or indicators may be remote if desired.

The tarnsmitting units 10' and 11' of the encoders may be conventional commercially avaliable pulse generators which are driven by input shaft rotations. These conventional transmitters transmit a number of pulses proportional to the shaft rotation, for instance one pulse every .0005 inch or 2000 pulses per inch, thereby providing a reading accuracy plus or minus .0005 inch.

Figure 3:
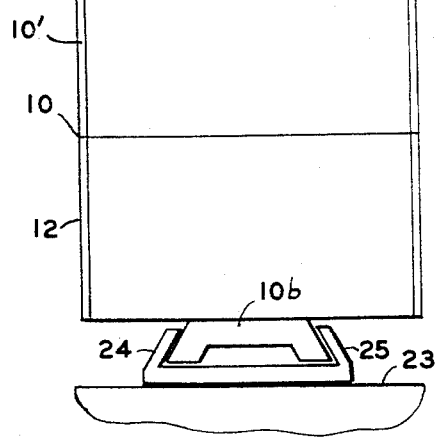
FIGURE 3 is a side view of the embodiment of FIGURE 2.
Figure 2:
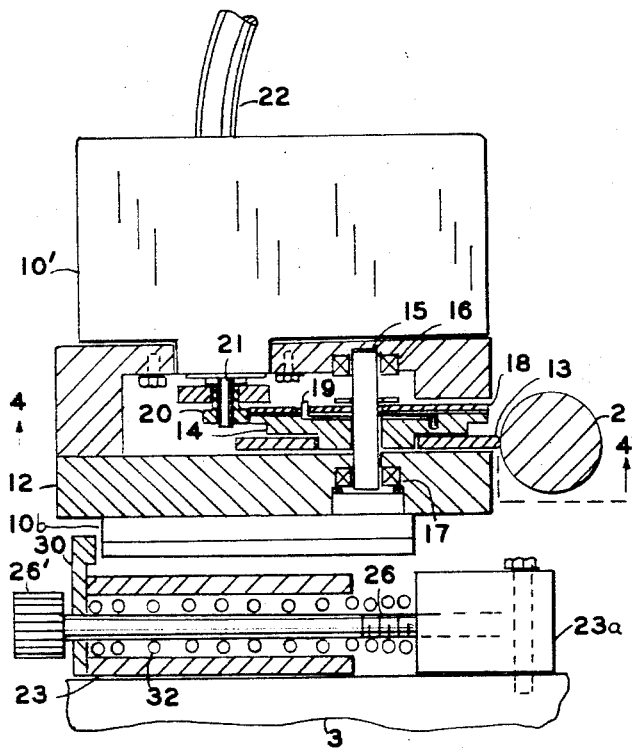
FIGURE 2 is a front view of the encoder-transmitter means partly in section.
Figure 4:
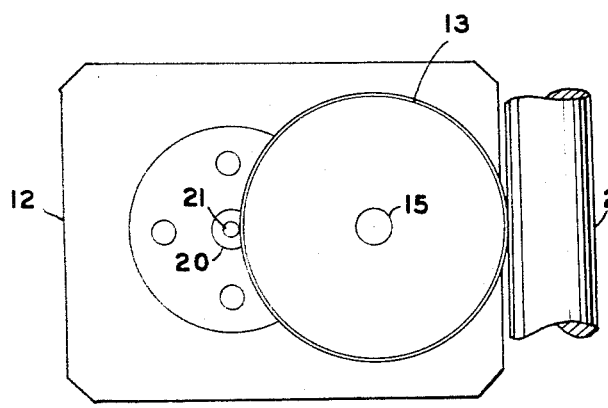
FIGURE 4 is a detail view of the bottom of the encoder with the bottom cover removed and along line 4—4 of FIGURE 2.

FIGURES 2, 3, and 4 show detail views of the transmitting encoders 10 and 11. These transmitting encoders generally comprise a casing 12 mounting a rotatable friction wheel 13 which is adapted to ride on one of the rails 4. The friction wheel 13 may be of hardened steel or a material having a high coefficient of friction and preferably has chamfered edges. The wheel 13 is mounted on a gear 14 which is mounted on the shaft 15 which is rotatably mounted in the casing by means of bearings 16 and 17.

A nylon gear 18 of the same size is connected to gear 14 by means of spring 19 to eliminate backlash. The gears 14 and 18 are geared to the pinion gear 20 which is mounted on the shaft 21 of the conventional generator transmitter 10'. The pulse generator is a conventional commercially available device which is adapted to generate pulses proportionally to input shaft rotation and it is mounted on the casing 12 by suitable mounting bolts. The output of the pulse generator is transmitted over the cable 22 to utilization apparatus such as visual counter, programming means, computer means or other utilization apparatus.

The transmitter-encoders 10 and 11 are mounted on the carriages by a spring loaded mounting assembly 23. The casing 10 has a tapered wedge 10b which fits into a slot formed by the arms 24 and 25 of the mounting member 23, FIGURE 3. The mounting block 23a is fixedly connected to the carriages 3 or 6 as the case may be, by means of suitable bolts. The member 23 is adjustably connected to the member 23a by means of a large bolt 26 which is adapted to be rotated by means of knob 26'.

The foot member 30 is fixedly connected to mounting member 23 which is spring loaded up by means of spring member 32.

The foot 30 bears against the wedge 11b of the encoder-transmitter. Therefore, when the knob 26' is tightened up, the foot 30 presses down the encoder-transmitter and the friction wheel is put in the desired contact pressure with the rail 4 and it is held in this position by means of spring 32.

Many modifications may be made by those who desire to practice the invention without departing from the scope thereof which is defined by the following claim.

I claim:

1. In a work layout machine comprising a first carriage adapted to move along first rails and a second carriage adapted to move along second rails mounted on said first carriage, said second rails being perpendicular to said first rails;
   - means for measuring and transmitting coordinate information of carriage positions along said first and second rails comprising,
   - first measuring and transmitting means mounted on said first carriage comprising,
   - a casing adapted to be connected to said first carriage,
   - a friction wheel rotatably mounted in said casing and adapted to ride on one of said first rails,
   - means to adjust the pressure of said friction wheel on said one of said first rails comprising a spring loaded adjustable connecting means comprising,
   - a slotted mounting member connected to said carriage,
   - a wedge mounted in said casing and adapted to fit in said slot,
   - and an adjustably spring loaded foot adapted to bear on the top of said wedge to apply adjustable pressure to said casing and said friction wheel against said rail,
   - a shaft driven transmitter-encoder in said casing connected to be driven by said wheel, and an electrically operated digital display device mounted for easy visibility and connected to said transmitter encoder to indicate in digital form coordinate information of the position of said carriage.

References Cited

UNITED STATES PATENTS

| | | |
|---|---|---|
| 2,315,747 | 4/1943 | Terry et al. _____ 33—129 |
| 2,353,726 | 7/1944 | Guttmann. |
| 2,557,450 | 6/1951 | Mentzel. |
| 3,077,804 | 2/1963 | Manaloris. |
| 3,198,164 | 8/1965 | Nyberg et al. |
| 3,307,265 | 3/1967 | Jenks et al. |

FOREIGN PATENTS

| | | |
|---|---|---|
| 509,406 | 1/1955 | Italy. |

WILLIAM D. MARTIN, JR., *Primary Examiner*.

U.S. Cl. X.R.

33—125, 189